US012659438B2

(12) United States Patent
Sarasso

(10) Patent No.: US 12,659,438 B2
(45) Date of Patent: Jun. 16, 2026

(54) OPTICAL LOCALIZATION SYSTEM

(71) Applicant: UBIQUICOM S.R.L., Milan (IT)

(72) Inventor: Stefano Sarasso, Milan (IT)

(73) Assignee: UBIQUICOM S.R.L., Milan (IT)

( * ) Notice: Subject to any disclaimer, the term of this patent is extended or adjusted under 35 U.S.C. 154(b) by 94 days.

(21) Appl. No.: 18/700,730

(22) PCT Filed: Jul. 5, 2022

(86) PCT No.: PCT/IB2022/056203
§ 371 (c)(1),
(2) Date: Apr. 12, 2024

(87) PCT Pub. No.: WO2023/062445
PCT Pub. Date: Apr. 20, 2023

(65) Prior Publication Data
US 2025/0240392 A1    Jul. 24, 2025

(30) Foreign Application Priority Data

Dec. 10, 2021    (IT) ........................ 102021000026402

(51) Int. Cl.
H04N 9/31 (2006.01)
(52) U.S. Cl.
CPC ................................. H04N 9/3194 (2013.01)
(58) Field of Classification Search
CPC ........... H04N 9/3194; G01S 1/70; G01S 5/16; G05D 1/0248; G01C 21/206
See application file for complete search history.

(56) References Cited

U.S. PATENT DOCUMENTS 7,706,917 B1 *    4/2010    Chiappetta ............. G05D 1/648
                                                          700/258
2005/0213082 A1    9/2005    DiBernardo et al.

OTHER PUBLICATIONS

International Search Report and Written Opinion received for International Application No. PCT/IB2022/056203, mailed on Nov. 17, 2022, pp. 15.

* cited by examiner

*Primary Examiner* — Tony Ko
(74) *Attorney, Agent, or Firm* — Perilla Knox & Hildebrandt LLP; Jason M. Perilla

(57)    ABSTRACT

A localization system for a work area comprises at least one projector (2), at least one optical device (3) and a control unit. The projector (2) is configured to emit an optical signal (S) at a ceiling of the work area. The at least one optical device (3) is couplable to a respective collector (C) adapted to stow and/or handle products in the work area and is configured to monitor in a use configuration an acquisition zone arranged above the collector (C), so as to acquire at least a portion of the optical signal (S) generating a measurement signal. The control unit is connected to the optical device (3) and is configured to receive the measurement signals by determining as a function thereof the position of the collector (C) in the work area.

12 Claims, 2 Drawing Sheets

OPTICAL LOCALIZATION SYSTEM

CLAIM OF PRIORITY

This application is a § 371 National Phase Application of International Application No. PCT/IB2022/056203, filed on Jul. 5, 2022, now International Publication No. WO/2023/062445, published on Apr. 20, 2023, which claims priority to Italian Application No. 102021000026402, filed on Oct. 14, 2021, both of which are incorporated herein by reference in their entirety.

TECHNICAL FIELD

The present invention relates to the technical field of safety and localization devices.

In particular, the present invention relates to a localization system that can be installed in a work area and can determine the position of various elements present and possibly moving within it at any moment and in a particularly efficient manner.

Specifically, the system is of the optical type or uses optical signals to monitor the position of the elements of interest.

These elements can be elements that can be moved or handled within the work area such as shelves, cabinets, pallets, tanks, containers, drums, cages or similar elements suitable for stowing products or can be trolleys that are self-propelled or not and self-driving or not and configured for handling the products within the work area.

These elements will hereinafter be identified generically with the term "collectors", being understood to intend them as elements suitable for the collection of products within the work area both for the purpose of their storage as well as for their handling between several different positions.

PRIOR ART

With regard to the collectors used for displacing the products, in the reference sector it is known to use trolleys (or similar elements) driven by an operator or self-driven or carts or towable or transportable means to displace products within a work area defined for example by a warehouse presenting one or more loading/unloading stations, conveyors and shelves through which the products are received, sorted and stored.

In particular, the trolleys move along one or more handling paths that extend and intersect within the work area.

In order to optimize the processes of transfer and storage of products within the area, it is necessary to know as precisely as possible the instantaneous position of all the trolleys present and in operation.

In fact, being able to know in real time the exact position of each operating trolley within the work area allows to assign more precisely and accurately the paths to follow to each individual trolley in order to optimize the operation thereof, or reduce the times required for each product displacement operation, or ensure the safety of the means and of the operators who are on board or who move in the movement area of the same.

In fact, by accurately knowing the position of the trolleys it is possible to determine at each instant which is, for example, the most suitable for the execution of a given task, or to determine the maximum speed at which the vehicle can move to ensure, in a given area, the safety of workers.

In addition, this piece of information is particularly useful also in order to increase safety in the workplace.

In fact, in many zones of the work area, especially at intersections, the risk of collisions between trolleys that come from different directions and are following respective handling paths or even between trolleys and pedestrians that are moving within the area and are transiting even for short distances at the handling paths may be high.

In this context, a precise and accurate knowledge of the position of the trolleys allows suggesting handling paths that minimize the risk of collision and to generate warning signals if it is determined that two or more trolleys are being handled within the same zone or are following trajectories that can cause their collision.

To date, two different approaches to the problem of monitoring the position of the trolleys using optical recognition/computer vision techniques are particularly known and implemented.

A first approach involves drawing on the floor of the work area a plurality of graphic elements (for example two-dimensional codes/patterns) uniquely associated with specific areas of the work area itself.

In this context, the trolleys are coupled with devices capable of acquiring these graphic elements (for example using video cameras, cameras or other similar optical sensors) and a control unit (centralized or present on board the trolleys themselves) receives the images acquired from the device installed on board each individual trolley and comparing them with a database determines their position.

This approach, however, is subject to considerable disadvantages as it can happen that at the floor of the work area additional elements are positioned (for example products, load pallets or other) that make it difficult the acquisition of the graphic elements and consequently the recognition thereof by the control unit.

In addition, these graphic elements, being at the points of passage of both trolleys and pedestrians, are easily and quickly worn requiring continuous and frequent maintenance to restore them and keep them correctly operational.

A second possible approach is to take advantage again of the graphic elements that are applied to the ceiling of the work area. However, this solution also suffers from disadvantages that make it inefficient.

In fact, the installation of the graphic elements on the entire ceiling of the work area requires the execution of works at height that require significantly long times for them to be completed.

During their execution, it is therefore necessary to block entire areas of the work area for long periods, causing considerable logistical problems.

In addition, this solution is also difficult to implement, as the ceilings of the stowage areas can usually show an irregular shape.

In order to ensure the correct operation of the localization systems of known type, it is necessary to ensure that the graphic elements are arranged in a homogeneous, regular manner and all at the same height.

It is therefore clear that if the ceiling is not flat, it becomes necessary to adapt the coupling mechanism of each individual graphic component in order to ensure the correct acquisition thereof by the optical devices installed on the collectors, lengthening the installation times and increasing their costs.

On the other hand, with regards to collectors aimed mainly at stowing products it might occur over time to have the need for reorganising the work area (due to a variation in the processed products, the available spaces, the tools and the amount of people moving within the area) or for handling collectors that in turn contain a plurality of products in order to carry out a single transport operation to handle large quantities of products.

Therefore, within the work area, not only could the position of the collectors, trolleys and the like, arranged for displacing the products, but also (especially in the long term) the position of the collectors, shelves and the like, arranged for their storage, change over time.

In light of the above, it is clear that in the field there is a strong need to develop new solutions for monitoring the collectors present within the stowage areas that are able to overcome at least the problems presented here.

OBJECT OF THE INVENTION

In this context, the technical task underlying the present invention is therefore to propose a localization system that overcomes at least some of the drawbacks of the prior art mentioned above.

In particular, it is an object of the present invention to provide a localization system that is easily installable, highly scalable and at low cost per surface unit of the localization area to be covered, while maintaining high levels of accuracy in identifying the position of the collectors present within the work area.

The defined technical task and the specified aims are substantially achieved by a localization system comprising the technical characteristics set forth in one or more of the appended claims.

According to the present invention a localization system for a work area is shown.

The system comprises at least one projector, at least one optical device and a control unit.

The at least one projector is configured to emit an optical signal at a ceiling of the work area.

The optical device is couplable to a respective collector present, in particular it can be handled, inside the work area.

The at least one optical device is configured to monitor in a use configuration an acquisition zone positioned above the respective collector.

In particular, the optical device acquires at least a portion of the optical signal by generating a measurement signal.

The control unit is connected with the at least one optical device to receive measurement signals therefrom.

The control unit is further configured to determine the position of the collector inside the work area on the basis of the respective measurement signal.

Advantageously, the system presented here makes it possible to identify the position of one or more collectors inside the work area in a simple and precise manner without requiring complex installation and maintenance works, guaranteeing high scalability and a low cost of the materials necessary to cover the monitored area, involved in the localization.

The dependent claims, incorporated herein by reference, correspond to different embodiments of the invention.

BRIEF DESCRIPTION OF THE DRAWINGS

Further characteristics and advantages of the present invention will become more apparent from the indicative and thus non-limiting description of a preferred but non-exclusive embodiment of a localization system, as illustrated in the attached drawings, in which.

DETAILED DESCRIPTION OF THE PREFERRED EMBODIMENTS OF THE INVENTION

Figure 1:
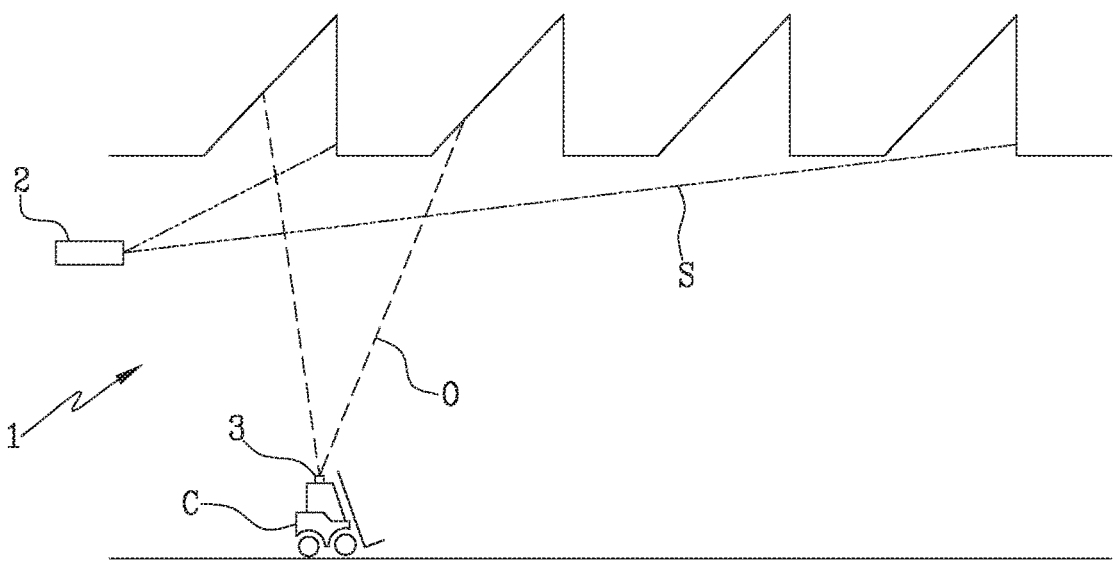
FIG. 1 shows a possible embodiment for the localization system presented herein.

In the appended figures, the numerical reference 1 indicates in general a localization system, identified hereinafter in the present description simply as the system 1.

In particular, the system 1 can be implemented to continuously monitor the position within a work area of the collectors C arranged for the storage and/or for the handling of the products to be stowed.

The term work area is intended to include in general terms any structure within which it is necessary to carry out operations for handling and/or storing products, such as warehouses, sorting centres and production plants and with the term collectors C it is instead intended to indicate any element present within the work area used or usable for stowing, storage and/or transport of products.

By way of example, the term collectors C can therefore indicate self-propelled elements such as self-driven vehicles (for example robots) or not (for example forklifts as explicitly illustrated in the accompanying drawings) adapted to move inside the work area.

The term collectors C, however, also includes elements that are self-propelled and can be suitably handled within the work area like for example towable/displaceable elements such as trolleys with idle wheels or pallets or structures typically identifiable for stowing that can be handled in particular to reorganize the internal spaces of the work area, such as shelves, cabinets or the like.

Structurally, the system 1 comprises at least one projector 2, at least one optical device 3 and a control unit.

In particular, the at least one optical device 3 is uniquely coupled to a collector C present within the work area and by way of not limiting example reference will be made in the following of the present description mainly to a situation in which the position of a plurality of collectors C is to be monitored and therefore the system comprises a plurality of optical devices 3 each of which is coupled to a respective collector C.

The projector 2 can be installed near the ceiling of the work area and is configured to emit an optical signal S.

In particular, in a use configuration, the projector 2 is arranged to project an optical signal S at the ceiling of the work area.

As will be specified below with the expression "at the ceiling", it is intended to indicate that the projector 2 projects the optical signal directly onto the ceiling or along a plane substantially parallel to a main extension direction of the ceiling.

Specifically, said optical signal S has a spatial distribution such as to define a plurality of distinct and mutually distinguishable portions.

In this way, it is possible to project a graphic template that is easily visible and identifiable at any point in the work area without having to install a large number of distinct elements on the entire ceiling.

In particular, the projector can be installed in a peripheral portion of the ceiling thus minimizing the inconvenience caused by the installation operation that affects only a single zone of the work area, which can therefore be advantageously selected from those in which the encumbrance and/or the traffic of collectors C is minimal.

In accordance with a first possible aspect of the present invention, schematically illustrated in FIG. 1, the optical signal S is representative of at least one graphic element and the projector 2 is configured to project the optical signal S (i.e. the graphic element) directly onto the ceiling of the work area.

In other words, the projector 2 is turned upwards and projects the graphic element (such as an image, a logo, a specific light pattern, alphanumeric codes or graphs such as QR code or other bar codes) onto the ceiling of the work area where it is easily visible.

Therefore, it is not necessary to apply different graphic elements on the entire surface of the ceiling of the work area but an optical signal S is simply projected onto it, which must not be restored or replaced over time, by activating a limited number of projectors 2 (possibly even only one) that can be quickly installed.

The number of projectors may be selected according to the structure of the ceiling, so as to ensure that there are no large zones of shadow that are not reached by the optical signal.

Figure 2A:
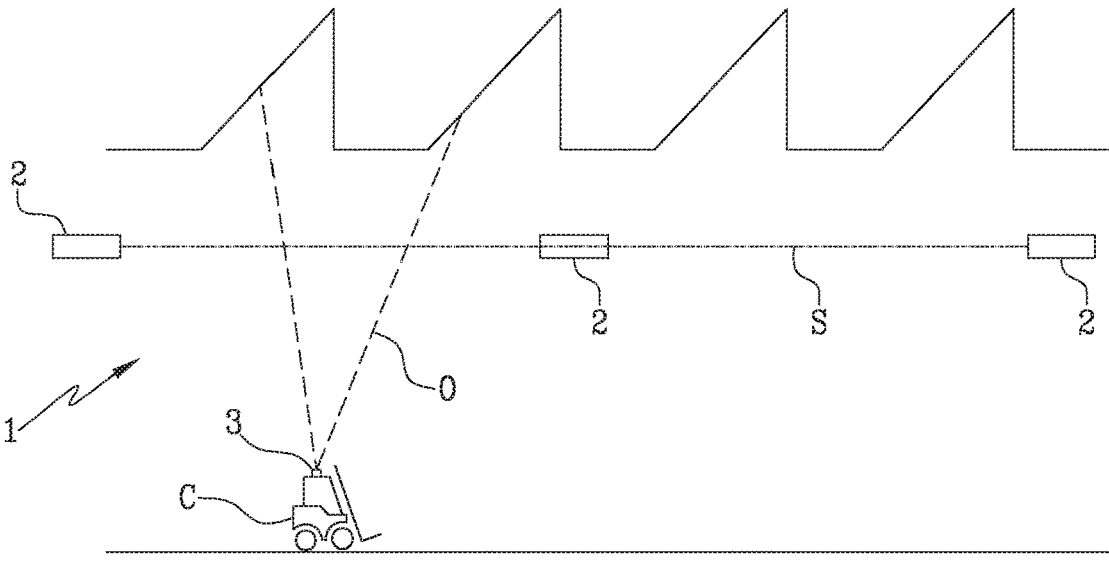
FIGS. 2A and 2B show a different possible embodiment for the localization system.
Figure 2B:
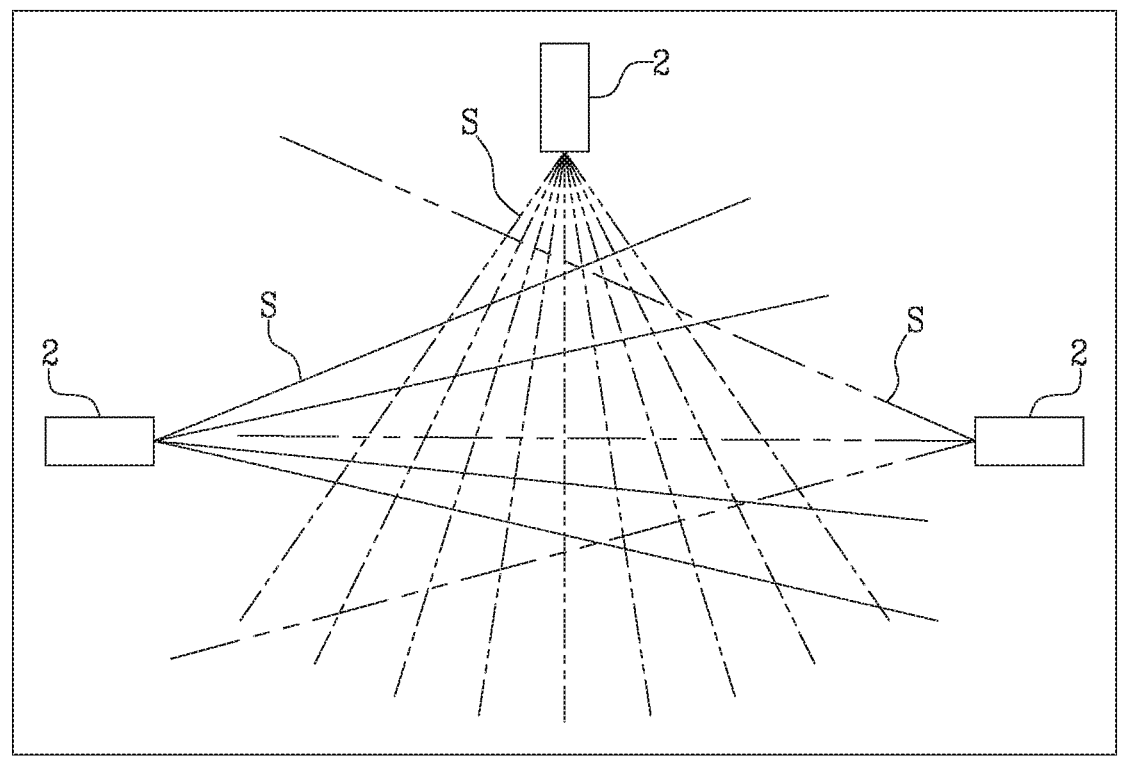

In accordance with a possible alternative, schematically illustrated in FIGS. 2A and 2B, the system therefore comprises a plurality of projectors 2 each of which is configured to generate a respective optical signal S.

The projectors 2 can be configured to generate identical optical signals S which contribute to defining a graphic element having a plurality of distinct, different and easily distinguishable zones or alternatively each projector 2 is configured to generate an optical signal S that is different from that generated by each other projector 2 or at least different from that generated by at least one other projector 2 and cooperating each with its own characteristics to define the overall graphic element.

In general, the plurality of projectors 2 is therefore configured to generate and project an overall optical signal S (given by the sum of the individual optical signals S of the respective projectors 2) that has a plurality of distinct portions easily distinguishable from each other in such a way that each zone is in use uniquely associated with a respective position within the work area. In this context, the projectors 2 can still be configured to project an image onto the ceiling of the work area according to the methods outlined above. Alternatively, the projectors 2 may be configured to generate an optical signal S so as to project it in a substantially horizontal direction.

In other words, the projectors 2 can be installed and oriented in such a way as to emit the optical signal S in a plane that is substantially parallel to that of the main extension of the ceiling.

This embodiment has the further advantage of not being influenced in any way by the specific structure of the ceiling of the work area since being spaced therefrom it does not suffer interference due for example to the presence of elements applied thereto (such as for example the case with the ventilation ducts).

Preferably, regardless of the number of projectors 2 present and whether these are arranged to project horizontally rather than onto the ceiling, the optical signal S may comprise a plurality of distinct rays.

Therefore, the rays are easily distinguishable from the optical devices 3 in order to identify the position of the optical device 3 (therefore of the collector C on which the latter is installed) within the work area in a unique way, for example according to one of the methods that will be discussed further below In the case where more projectors 2 are present, preferably the angular distance between the light rays of one projector 2 is different from the angular distance between the light rays of each other projector 2.

In this way an overall optical signal S presenting different portions easily distinguishable from each other can be generated.

In other words, the optical signal S defines at the ceiling of the work area an image, a combination of images (where the term images can also be understood simply as the combination of one or more light rays) presenting a plurality of different portions easily distinguishable from each other that once recognized by the control unit within the received measurement signals allow to define the position of the collectors C.

In the specific case in which the projectors 2 are configured to project distinct light rays, a pattern is then generated, for example a grid, at the ceiling of the work area in which the lines (represented by the light rays) intersect to define a plurality of patterns, for example of the intersections, each having a different and specific conformation as can be observed in the example shown in FIG. 2B.

In this way, depending on the image acquired by each optical device 3, it is possible to quickly and easily identify which intersection it corresponds to and therefore identify the position of the collectors C.

In fact, the optical devices 3 acquire the portion of the optical signal S above, generating a measurement signal that represents the rays displayed that define specific uniquely defined patterns at the various zones of the work area.

The control unit is therefore able to identify which rays are displayed by the various optical devices 3 at any moment, thus reconstructing the instantaneous position of each collector C by identifying the zone at which the rays appear in the manner represented in the measurement signal.

This approach remains generally applicable even if there is only one projector 1 and/or if an image representing a graphic element such as an image, one or more logos, one or more symbols or a series of graphic or alphanumeric codes is projected onto the ceiling of the work area.

In this context, the graphic element has peculiar characteristics that clearly differentiate the various portions (for example by means of specific combinations of colours and/or signs) in such a way that the control unit is able to uniquely determine in which position a given collector C must be located in order to have been able to generate the specific measurement signal sent to the control unit.

In general, in order to acquire the optical signal S generated by the projector 2 each collector C is coupled to one of the optical devices 3 in such a way as to present an upward-facing viewing angle.

By way of example, the optical devices may be realized by means of cameras or video cameras having a viewing angle O comprised in a range of −90° to +90° relative to a vertical axis and 360 degrees around said vertical axis, being easily adjustable for the acquisition of the optical signal S.

In this way, always in the use configuration, the optical devices 3 have a viewing angle that configures them to monitor an acquisition zone arranged above the collector C on which they are installed, thus acquiring a specific portion of the optical signal S.

In other words, the optical devices continuously acquire a portion of the optical signal S present above the collector C to which they are coupled.

The frequency of acquisition of the optical signal S and/or of generation of the measurement signal can be selected according to the type of collector C to which a given optical device 3 is coupled. For example, for frequently handled collectors C (for example forklifts) it is possible to opt for a continuous real-time acquisition and generation, while for usually stationary or rarely handled collectors C (for example shelves or pallets or battery-powered collectors C that may require predetermined stoppage times for recharging) it can be assumed to carry out the acquisition and the generation at regular intervals, for example at intervals of a few hours or a few days or dictated by the signals received from appropriate handling sensors integrated in the collector C (for example by carrying out the acquisition of the measurement signals only during or at the end of a handling process of the collector C).

In other words, the optical device 3 may be configured to generate the measurement signal at specific time intervals or in response to a trigger signal generated for example by a handling sensor coupled to the same collector C of the optical device 3.

Advantageously, the optical devices 3 can be configured to acquire optical signals S at non-visible wavelengths.

In other words, the optical signal S may have a wavelength outside the range of visible light, thus being non-invasive and avoiding the risk of distractions for the personnel working within the work area.

Regardless of the specific characteristics of the optical signal S, the optical devices 3 therefore generate a measurement signal representative of and identifying the acquired image, i.e. the portion of the optical signal S present above their collector C.

This measurement signal is transferred, for example by means of a wireless communication protocol, to the control unit which is in turn configured to receive them and to determine the position of each collector C as a function of a respective signal received.

In other words, the control unit is operatively connected with all the optical devices 3 to receive in real time the portion of optical signal S that is acquired by the latter and by means of this piece of information it determines the precise position of each collector C within the work area.

Alternatively, the system may comprise a distinct control unit for each collector C, wherein each control unit is specifically configured to receive the measurement signal generated by the optical device 3 present on the same collector determining the position thereof.

In this second case, the connection between the optical device 3 and the control unit can also be of the wired type.

The information contained in the measurement signals received by the control unit can also be further transmitted to further devices (for example further control units or mobile terminals) present, for example, within the work area.

The system 1 can further comprise a database within which it is possible to store the information that the control unit can use to identify particularly efficiently and in a performing way the position of the collectors C within the work area.

In accordance with an aspect of the present invention, the database is configured to store a plurality of reference images representative of different portions of the optical signal S, which can be for example acquired and stored during the installation of the system.

In this context, the control unit is configured to compare, also for example with hashing or indexing algorithms which are particularly efficient, the measurement signal received by each optical device 3 with the reference images by identifying the position of the individual collectors C as a function of an at least partial identity between the respective measurement signal and at least one of the reference images.

In other words, the database stores a plurality of reference images each of which shows the optical signal S as it is seen in different zones within the work area.

The control unit then compares the measurement signals received with said reference images and when it identifies a condition of traceability or at least of substantial traceability between a given reference image and the measurement signal received in that moment from one of the optical devices 3, it determines that the collector on which said optical device 3 is installed is at the zone to which the reference image that can be traced back to the acquired measurement signal is associated.

In more detail, the control unit is configured to compare the measurement signal with the plurality of reference images by applying a maximum likelihood algorithm by which a match between the measurement signal and at least one of the reference images can be detected.

In accordance with a particular embodiment, the optical signal S is defined by one or more position codes (graphic, alphanumeric or other kind such as colour codes) projected onto or at the ceiling of the work area and in this context the reference images represent a unique association between a specific code and the portion of the work area at which said code appears to be projected.

In this context, when the control unit, by processing the measurement signal, identifies that a certain code has been acquired, it queries the database and verifies to which specific position this code refers.

In accordance with a further possible aspect of the present invention, each projector 2 is configured to generate the respective optical signal S according to a specific series of predefined parameters (type of the generated graphic representation, projection direction, luminous intensity, colour range) so that the characteristics of each individual portion of the optical signal S that is projected are defined a priori.

In this context, the database is configured to store these predefined parameters and when the control unit acquires a measurement signal it processes it as a function of the predefined parameters to determine in which position (therefore in which zone of the ceiling) it is possible to view and acquire a portion of optical signal S presenting the characteristics shown by the measurement signal.

In other words, in this specific context, the measurement signal is not compared with a database of pre-acquired images but the control unit deduces in which position a certain collector C is in because since it knows the predefined parameters as a function of which the optical signal S is generated it can reconstruct the position in which a certain collector C is in order to have been able to generate a certain measurement signal.

Operationally, therefore, the at least one projector 2 by applying the predefined parameters generates and projects the optical signal S and the control unit knowing these predefined parameters determines in which position a portion of the optical signal S corresponding to that represented in a given measurement signal can be acquired.

Advantageously, the system 1 may further comprise a fixed acquisition device installed within the work area and also configured to acquire the optical signal S; preferably the system 1 comprises at least one acquisition device for each projector 2.

Operationally, the acquisition device may comprise a video camera, a camera or any other device capable of acquiring in optical signal S and is installed in a fixed position in which it always receives the same optical signal S.

If the optical signal S undergoes changes over time (for example because of slight displacements of the projector due to vibrations or under the effect of gravity), the acquisition device detects this change and generates an alert signal.

This alert signal makes it possible to immediately identify any changes in the generation of the optical signal S, which in turn could cause inaccuracies in the process of identifying the position of the collectors C.

In fact, if the optical signal S changes over time, in particular if it undergoes changes in position with respect to the ceiling of the work area, the optical devices 3 would generate measurement signals that are no longer accurate, causing the risk of incorrect or in any case inaccurate determination of the position of the collectors C by the control unit.

In this context, the generation of the alert signal, which can be for example an acoustic signal and/or an optical signal S and/or an electronic signal that causes the generation and display of a notification on a terminal (an electronic device) connected/coupled with the control unit, allows to immediately notify an operator of the occurred change so that it can be corrected promptly.

In accordance with an aspect of the present invention, the system 1 further comprises an actuator coupled to the projector 2 (in particular a distinct actuator coupled to each projector 2 present), configured to change the position and/or the orientation of at least one projector 2 as a function of the alarm signal.

In other words, the system 1 comprises actuators to which the projectors 2 are coupled and by means of which it is possible to move these projectors 2 in such a way as to ensure that the optical signal S remains unchanged over time.

Operationally, if the optical signal S acquired by the acquisition device undergoes changes, the actuator of at least one projector 2 is activated in such a way as to return the optical signal S to its original position.

In this way it is certain that the optical devices 3 installed on the collectors C always acquire portions of an optical signal S that remains unchanged over time.

Advantageously, the present invention achieves the proposed purposes by overcoming the drawbacks complained of in the prior art by making available to the user a localization system 1 that is easy to install and with reduced costs since it is sufficient to provide a limited number of projectors 2 instead of installing numerous specific graphic elements on the entire surface of the ceiling of the work area.

In addition, the system 1 described herein has a longer service life than the known systems as it is more resistant to wear, allowing the position of the collectors C present within the work area to be determined by means of graphic elements that are projected and not made by means of physical elements that require frequent maintenance and replacement works.

The present invention further relates to a localization installation implementable within a production and/or logistic zone for monitoring, in particular real-time monitoring, the position of the collectors C present within said zone.

In more detail, the zone has a plurality of distinct work areas each of which belongs to one or more of the possible different types of area identified above.

Structurally, the installation comprises a plurality of localization systems 1 each of which is associated with a distinct and respective work area.

In particular, each system 1 is made in accordance with one or more of the technical characteristics outlined above.

The installation further comprises at least one auxiliary localization system associable with the at least one collector C and configured to generate a position signal identifying the work area in which the at least one collector C is positioned.

In other words, through the auxiliary localization system it is possible to determine within which specific work area a collector C is located at a given moment.

As is already the for the control unit, the auxiliary localization system can also be defined by means of a single centralized system operatively connected with each of the collectors C present within the production and/or logistic zone or by means of a plurality of distinct and autonomous auxiliary localization systems each of which is coupled to a respective collector C.

By way of not limiting example, the auxiliary localization system can be implemented by means of a radio transmission system using a technology of the Bluetooth beaconing type.

In this context, the control unit is configured to determine the position of the at least one collector C within the production and/or logistic zone as a function of the position signal and of the measurement signal.

Thus, the control unit is connected with the at least one auxiliary localization system in order to receive the position signal therefrom.

In other words, the control unit then determines in which work area the collector is located thanks to the information contained in the position signal transmitted by the auxiliary localization system and it simultaneously identifies the specific position in which the collector C is located within this area thanks to the information contained in the measurement signal generated and transmitted by the relative optical device 3.

In accordance with a first possible method of implementation, the installation comprises a single control unit and a single auxiliary localization system that can be integrated into a single device and connected to each collector C present in the zone.

In accordance with a further possible implementation mode, the installation comprises a plurality of control units and a respective plurality of auxiliary localization systems that can be integrated to define a corresponding plurality of devices each of which is coupled to a different collector C.

Alternatively, the installation may comprise a single control unit connected with a plurality of auxiliary localization systems associated with respective collectors C, or a single auxiliary localization system connected with a plurality of control units associated with respective collectors C.

It is then possible to use the information provided by the auxiliary localization system to identify the work area in which the collector C is located and then identify its precise and specific position thanks to the measurement signal obtained by the respective optical device 3.

This solution makes it possible to use identical systems 1 and generate identical optical signals S within several distinct work areas of the production and/or logistic zone, simplifying the installation operations of the installation and making it particularly efficient and precise even on particularly large areas.

The invention claimed is:

1. A localization system for a work area, comprising:
    at least one projector configured to emit an optical signal at a ceiling of the work area;

at least one optical device couplable to a respective collector present in said work area, said optical device being configured to monitor, in a use configuration, an acquisition zone positioned above the respective collector so as to acquire at least one portion of the optical signal and to generate a measurement signal representative of said portion;

a control unit connected with the at least one optical device and configured to receive the measurement signal and to determine the position of the at least one collector inside the work area on the basis of the measurement signal;

wherein the optical signal comprises a plurality of light rays; and wherein a database adapted to store a plurality of reference images representative of respective portions of the light rays and wherein the control unit is configured to identify the position of each collector by comparing the respective measurement signal with the plurality of reference images.

2. The system according to claim 1, wherein the optical signal is representative of a graphic element and preferably said at least one projector is configured to project the optical signal onto the ceiling of the work area.

3. The system according to claim 1, wherein the at least one optical device has a viewing angle comprised in a range of −90° to +90° relative to a vertical axis and of 360 degrees around said vertical axis.

4. The system according to claim 3, wherein the optical signal has a wavelength outside the range of visible light.

5. The system according to claim 1, wherein the at least one projector is configured to project the optical signal along a substantially horizontal direction.

6. The system according to claim 1, comprising a plurality of projectors, each projector preferably being configured to generate a respective optical signal that is different from the optical signal generated by at least one other projector.

7. The system according to claim 1, wherein an angular distance between the light rays projected by one projector is different from the angular distance between the light rays projected by at least one other projector.

8. The system according to claim 1, wherein the control unit is configured to compare the measurement signal with the plurality of reference images by applying a maximum likelihood algorithm adapted to detect a correspondence between the measurement signal and at least one reference image.

9. The system according to claim 1, comprising a fixed acquisition device configured to acquire the optical signal and to generate an alert signal in response to a variation of said optical signal, preferably in response to a variation in the position of said optical signal.

10. The system according to claim 9, comprising an actuator configured to modify the position and/or orientation of at least one projector on the basis of the alert signal.

11. A localization installation for a production and/or logistics zone having a plurality of distinct work areas, said installation comprising:

a plurality of systems according to any one of the preceding claims, said systems being coupled to respective work areas;

at least one auxiliary localization system associable with the at least one collector and configured to generate a position signal identifying the work area in which the at least one collector is positioned;

said control unit being configured to determine the position of the at least one collector inside the production and/or logistics zone on the basis of the position signal and of the measurement signal.

12. A localization system for a work area, comprising:

at least one projector configured to emit an optical signal at a ceiling of the work area;

at least one optical device couplable to a respective collector present in said work area, said optical device being configured to monitor, in a use configuration, an acquisition zone positioned above the respective collector so as to acquire at least one portion of the optical signal and to generate a measurement signal representative of said portion;

a control unit connected with the at least one optical device and configured to receive the measurement signal and to determine the position of the at least one collector inside the work area on the basis of the measurement signal;

wherein the at least one projector is configured to generate the optical signal in accordance with a plurality of predefined parameters and the control unit comprises a database adapted to store said predefined parameters; said control unit being configured to identify the position of each collector by processing the respective measurement signal on the basis of the plurality of predefined parameters so as to determine in which position the at least one projector projects the portion of the optical signal represented by the respective measurement signal.

* * * * *